(12) United States Patent
Zilioli

(10) Patent No.: US 6,745,666 B2
(45) Date of Patent: Jun. 8, 2004

(54) POSITION SENSOR FOR OIL-OPERATED PISTON/CYLINDER UNITS

(75) Inventor: Eduardo Zilioli, Provazza di Provaglio (IT)

(73) Assignee: Gefran Sensori S.r.l. (IT)

(*) Notice: Subject to any disclaimer, the term of this patent is extended or adjusted under 35 U.S.C. 154(b) by 0 days.

(21) Appl. No.: 10/164,153

(22) Filed: Jun. 6, 2002

(65) Prior Publication Data
US 2003/0010197 A1 Jan. 16, 2003

(30) Foreign Application Priority Data
Jun. 7, 2001 (EP) .............................. 01830373

(51) Int. Cl.[7] .............................................. F15B 15/28
(52) U.S. Cl. ................................... 92/5 R; 324/207.13
(58) Field of Search ............. 91/1; 92/5 R; 324/207.13, 324/207.24

(56) References Cited

U.S. PATENT DOCUMENTS

| 4,656,457 | A | * | 4/1987 | Brausfeld et al. | ............. 92/5 R |
| 4,879,440 | A | * | 11/1989 | Lymburner | .................. 92/5 R |
| 4,910,491 | A | * | 3/1990 | Gottling et al. | ............. 338/176 |
| 5,138,934 | A | * | 8/1992 | Murayama et al. | ............ 92/5 R |
| 5,150,049 | A | * | 9/1992 | Schuetz | ........................ 92/5 R |
| 6,356,071 | B1 | * | 3/2002 | Koski et al. | ........... 324/207.13 |
| 6,588,313 | B2 | * | 7/2003 | Brown et al. | .................. 92/5 R |

FOREIGN PATENT DOCUMENTS

| DE | 298 15 317 U1 | 12/1998 |
| WO | WO-98/17974 A1 | 4/1998 |

* cited by examiner

Primary Examiner—Thomas E. Lazo
(74) Attorney, Agent, or Firm—Akerman Senterfitt

(57) ABSTRACT

The invention relates to a position sensor for oil-operated piston/cylinder units and adapted for installation inside the cylinder of the unit. The sensor comprises a cursor mounted for displacement inside a linear potentiometer that is associated with one piston end to provide an indication of the piston travel. Advantageously, the potentiometer and cursor are housed inside an armored case. A magnetic actuator is associated to the piston and slidable along the outer surface of the armored case in magnetic coupling relationship with the cursor.

The steel structure of the case is sealed to enable use of the sensor under very high pressures.

27 Claims, 3 Drawing Sheets

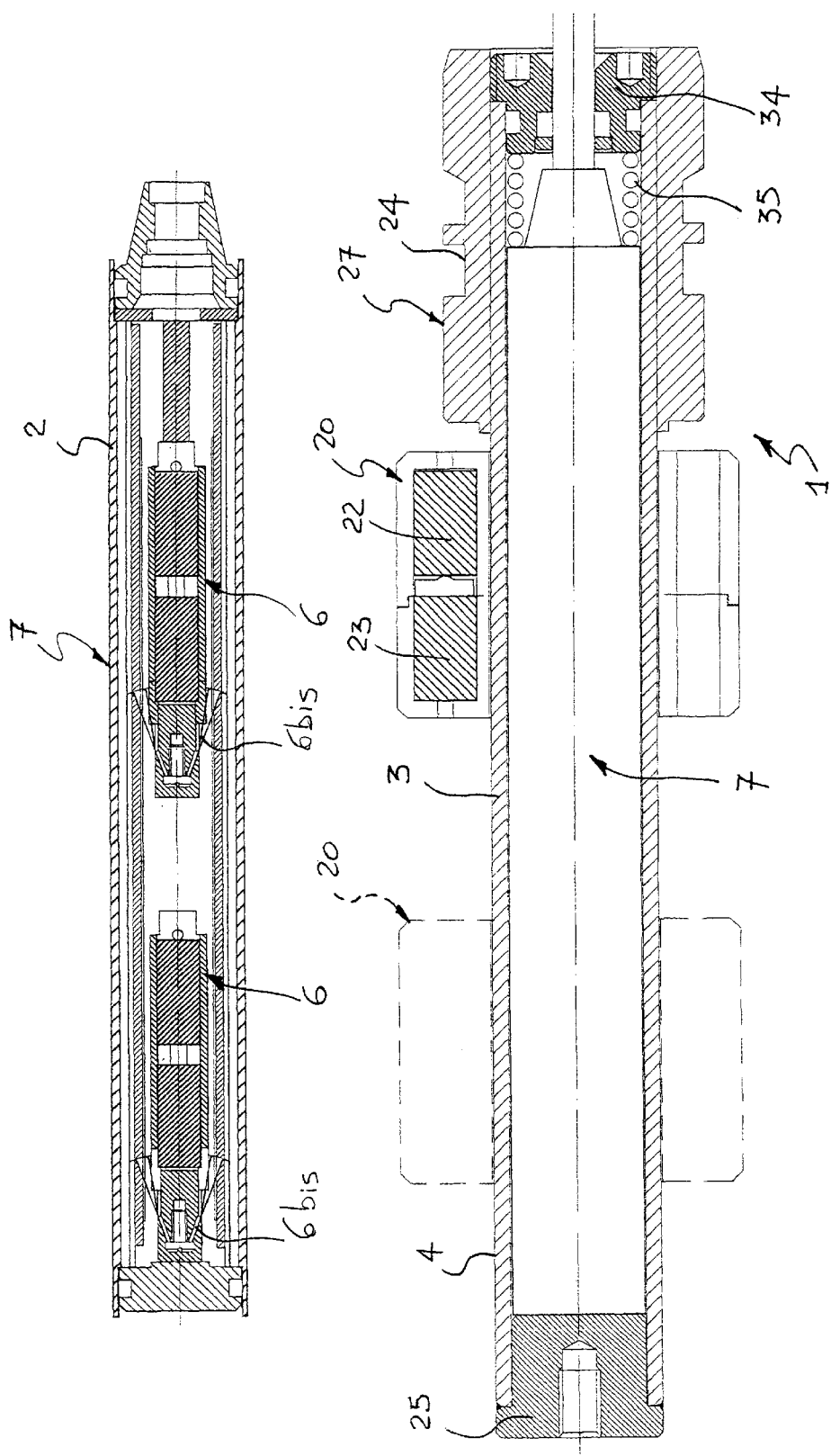

POSITION SENSOR FOR OIL-OPERATED PISTON/CYLINDER UNITS

DESCRIPTION

1. Field of Invention

The present invention relates to a position sensor for oil-operated piston/cylinder units.

The invention relates, particularly but not exclusively, to a sensor adapted for installation in the cylinder and provided with a cursor, which cursor is mounted for displacement along a linear potentiometer and associated with one end of the piston to provide an indication of the piston travel.

2. Background Art

As is well known in this technical field, there are a large number of industrial applications where the position and/or the displacement of moving parts of power driven equipment must be reported.

Equipping oil-operated piston/cylinder units with position transducers in order to obtain an indication of the piston linear travel inside the cylinder is long-established practice.

In other words, the position transducers used in oil-operated piston/cylinder units are capable of detecting the piston travel with a relative precision.

Such position transducers are usually of the potentiometer type and comprise a sensor consisting of a linear potentiometer formed with conductive tracks, and a cursor associated with the piston head for displacement along the potentiometer.

Although on several counts advantageous and substantially successful, these prior transducers have some deficiencies, as specified here below.

First, the potentiometer conductive track is submerged in an oil bath inside the cylinder, which may impair the potentiometer reliability and precision in the event of even a small amount of water being present therein.

To obviate this problem, special oils are used that are guaranteed water-free, but that are also highly expensive.

Then, there are many applications where cylinders are operated in an unfriendly environment, e.g. under a low-temperature condition. In this case, the low temperature makes the working oil more viscous inside the cylinder, which may cause the cursor wipers to be pushed off the conductive tracks, albeit temporarily only, and result in faulty contacting.

Furthermore, the very high oil pressure inside the piston/cylinder unit makes its working conditions quite severe, resulting in premature sensor wear and deterioration.

In this context, taking down and replacing the sensor for maintenance or servicing may pose problems. In many cases, replacing the sensor may take several hours of skilled work, with attendant general difficulties and economic losses from downtime.

The state of the art provides no improvements to position sensors installed inside piston/cylinder units as can obviate the above deficiencies.

A magnetic coupling type of position sensor is disclosed in PCT Patent No. WO 98/17974 to Data Instruments, Inc.

However, that sensor is intended for use as a level sensor, and no mention is made in the patent specification of a possible use of the sensor inside piston/cylinder units, nor are the problems that this involves addressed thereby.

The aim of the present invention is that of providing a linear position transducer, or linear position sensor, with suitable constructional and functional features for use inside oil-operated piston/cylinder units and operation under a very high working pressure, such that it can overcome the deficiencies of the prior sensors discussed hereinabove.

A further object of the invention is that of providing a oil-operated piston/cylinder unit including a position sensor having an improved structure to allow operation under very high pressure.

SUMMARY OF THE INVENTION

The principle on which this invention stands is that of housing the sensor a sealed and armored case to be included in the cylinder; a magnetic coupling is established between a sliding magnetic actuator placed outside the case and a cursor inside the sensore.

In this way, the sensor is substantially enclosed and fully protected against the unfriendly environment in which it is expected to operate.

The invention provides a position sensor installed inside a cylinder of a oil-operated piston/cylinder units, comprising:

- a linear potentiometer being associated with one piston end to provide an indication of the piston travel;
- a cursor mounted for displacement inside said linear potentiometer; said potentiometer and said cursor being housed within an armored case;
- a magnetic actuator associated with the piston and slidable along the outer surface of said case in magnetic coupling relationship with said cursor.

The invention further provides a oil-operated piston/cylinder unit including a position sensor installed inside a cylinder of the piston/cylinder unit and comprising:

- an armored case;
- a linear potentiometer of a position transducer being house in said armored case and associated to one end of said unit for providing an indication of the piston travel;
- a cursor mounted for displacement inside said linear potentiometer;
- a magnetic actuator associated with the piston and slidable along the outer surface of said armored case in magnetic coupling relationship with said cursor.

The features and advantages of a position sensor according to the invention will be apparent from the following description of an embodiment thereof, given by way of non-limiting example with reference to the accompanying drawings.

In such drawings:

BRIEF DESCRIPTION OF THE DRAWINGS

FIG. 2 is a schematic longitudinal section through a detail of the sensor shown in FIG. 1.

FIG. 3 is a schematic longitudinal section through the sensor shown in FIG. 1.

DETAILED DESCRIPTION

Figure 1:
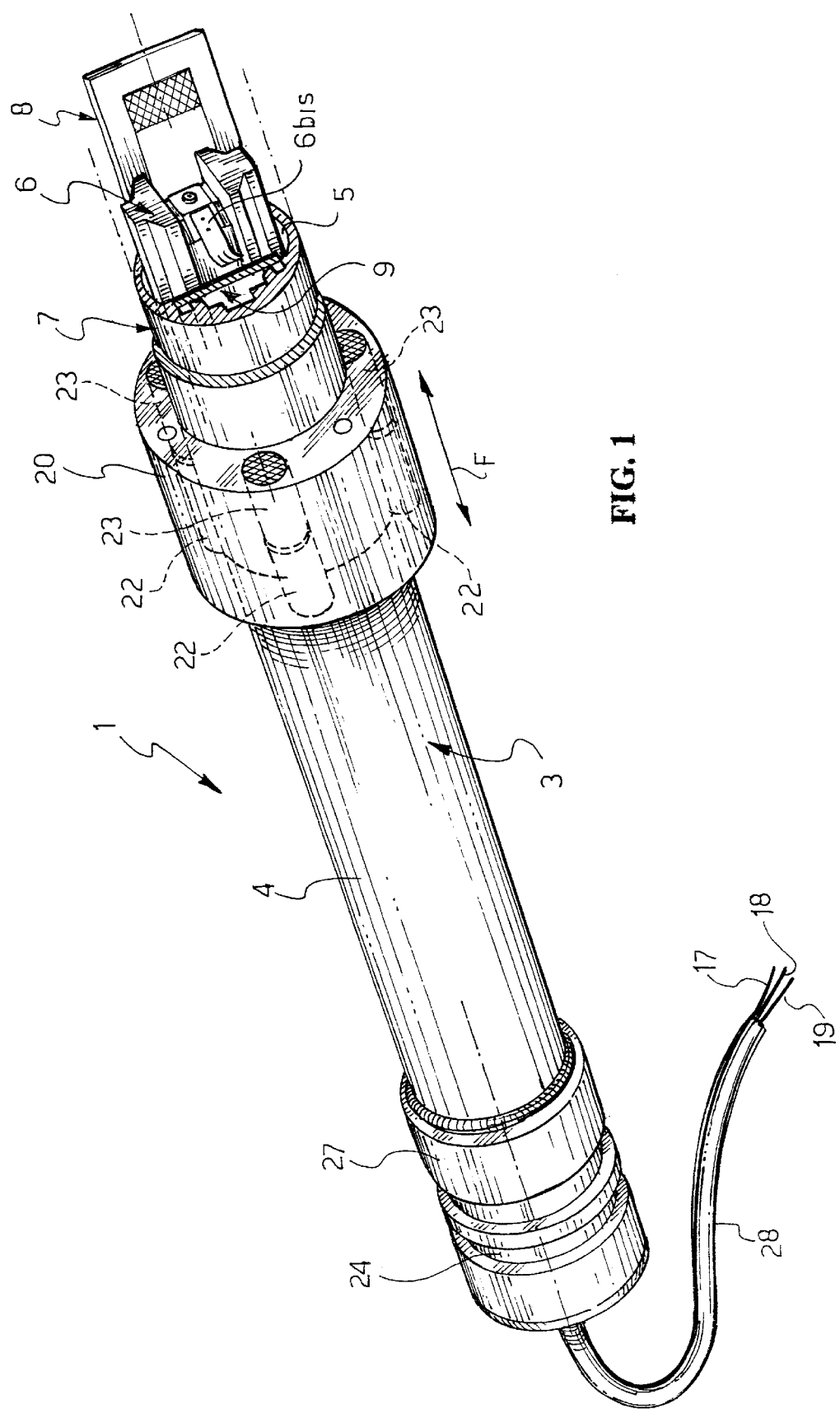
FIG. 1 is a schematic perspective view of a linear position sensor according to this invention.

With reference to the drawing views, and specifically to the embodiment shown in FIG. 1, a linear position sensor according to the invention is shown generally at 1 in schematic form. The sensor 1 is intended especially for installation inside a piston/cylinder unit 30 in a manner to be explained.

The sensor 1 forms an essential part of a position transducer, i.e. an electric device operative to detect a straight-line distance covered by an object associated therewith and to issue electric voltage and/or current signals corresponding to the linear distance travelled by the sensor and imposed by the object.

The sensor 1 comprises a tubular case 3 of preset length. The length of the case 3 may be 50 to 1000 mm, depending on individual requirements.

Preferably, the case 3 has a circular cross-sectional shape whose diameter is approximately 17 mm. Alternatively, the case 3 could have different cross-sectional shapes, e.g. triangular, square, or rectangular, and circular shapes of different diameters.

The case 3 has an outer surface 4 and defines an inner chamber volume 5 where a linear potentiometer 7 is received that mounts a magnetic cursor 6, as explained hereinafter.

A magnetic actuator 20 of toroidal shape is mounted around the case 3 for sliding movement along the outer surface 4 of the case. The actuator 20 has a central bore 21 through which the rod 3 is passed. Thus, the actuator 20 and case 3 are coaxial with each other. Of course, the shape of the bore 21 is to match the cross-section of the case 3, where that of the rod is other than circular.

The actuator 20 is a toroidal structure formed from a plastics material.

A plurality of permanent magnets 22, 23 of elongate cylindrical shape are embedded in the radial thickness of the toroidal actuator 20. The magnets 22, 23 have opposed ends polarized north N and south S.

In a preferred embodiment, pairs of the magnets 22, 23 are housed in the actuator 20 aligned to each other and parallel to the case 3, with poles N—N with the same polarity that are brought forcibly together but separated by a plastics partition, e.g. 2 mm thick. These magnet pairs 22, 23 are laid around the rod 3 at even angular spacings. For example, three magnet pairs 22, 23 could be laid 120° apart as shown in FIG. 1, or six magnet pairs could be laid 60° apart.

Anyway, a strong magnetic field will be generated perpendicularly to the axis of the case 3 such that the actuator 20, once assembled to the case 3, establishes a strong magnetic coupling to the magnetic cursor 6 of the linear potentiometer 7.

The cursor 6 mounts pairs of cylindrical magnets having respective pole ends N and S. These magnets are laid axially along the axis of the cursor 6. Like poles S—S of these cylindrical magnets are brought forcibly together and separated by a plastics partition, e.g. 2 mm thick.

In operation, as the actuator 20 slides along the outer surface 4 of the case 3, the cursor 6 in the chamber 5 is driven accordingly along the potentiometer 7.

The linear potentiometer 7 is mounted inside the inner chamber 5 and spans virtually the full length of the case 3. The linear potentiometer 7 comprises a pair of strips 8, 9 made of a conductive material and provided with respective terminals at their ends.

The strip 8 has a surface with a predetermined resistance that is proportional to its length. The strip 8 may be regarded as a variable resistor whose resistance can be set with high accuracy at any points along the strip surface.

An electric potential, considered as the difference of potential between the ends of the strip 8, can be measured by means of the potentiometer 7.

The strip 9, running parallel to the strip 8, is also formed from a conductive material, but provides no surface resistance. The strip 9 functions substantially as an electric collector to pick up an electric signal corresponding to the position occupied by the cursor 6 along the linear potentiometer 7.

The signal is transferred to the collector track 9 from the resistive track 8 through a contact wiper 6b is mounted on the cursor 6. The wiper 6b is includes a holder made of a conductive material, such as copper, holding two opposedly located wipers made of a noble metal.

Briefly, three electric connections are provided in the form of as many wire leads 17, 18 and 19. A first lead 17 is connected to apply a first predetermined electric potential, e.g. ground potential, to one end of the strip 8. A second lead 18 is connected to apply a second electric potential, normally higher than the first, to the other end of the strip 8.

The third lead 19 connects to one end of the other strip 9.

An electric potential, intermediate the first and the second potential, is measured at the third lead 19 and is dependent on the position of the cursor 6.

The potentiometer 7 itself is protected by a cylindrical envelope of aluminum.

Advantageously in this invention, the case 3 accommodating the linear potentiometer 7 and cursor 6 is armored and sealed.

More particularly, the case 3 is made preferably of a steel, AISI 316, 1.5 mm thick.

The free end of the case 3 is stopped with a plug 25, welded to that end all around. The plug 25 is formed centrally with a blind threaded socket 26 for attaching optional steadying rods designed to hold the sensor straight.

At the opposed end from the free end, the case 3 has an opening through which the potentiometer 7 can be introduced. The case 3 is, at the location of said opening, attached to an end portion 27, as by welding all around its periphery. This end portion is substantially cylindrical in shape, and a shielded cable 28 enclosing the wire leads 17, 18 and 19 can be taken out through it.

The potentiometer 7 is installed removably into the case 3 through the open end of the case 3. The potentiometer 7 is pushed into the case 3 to abut against the inner face of the plug 25, and is held in place by a bias spring means, e.g. a spring 35. In addition, a centrally bored ring nut 34 is threaded onto the open end of the sensor end portion 27 to admit the shielded cable 28 therethrough. The ring nut also retains the spring 35 biasing the potentiometer to its place.

The cable 26 is used for connecting the sensor 1 to an electronic measuring device 29 that forms a complete transducer in combination with the sensor 1.

Figure 4:
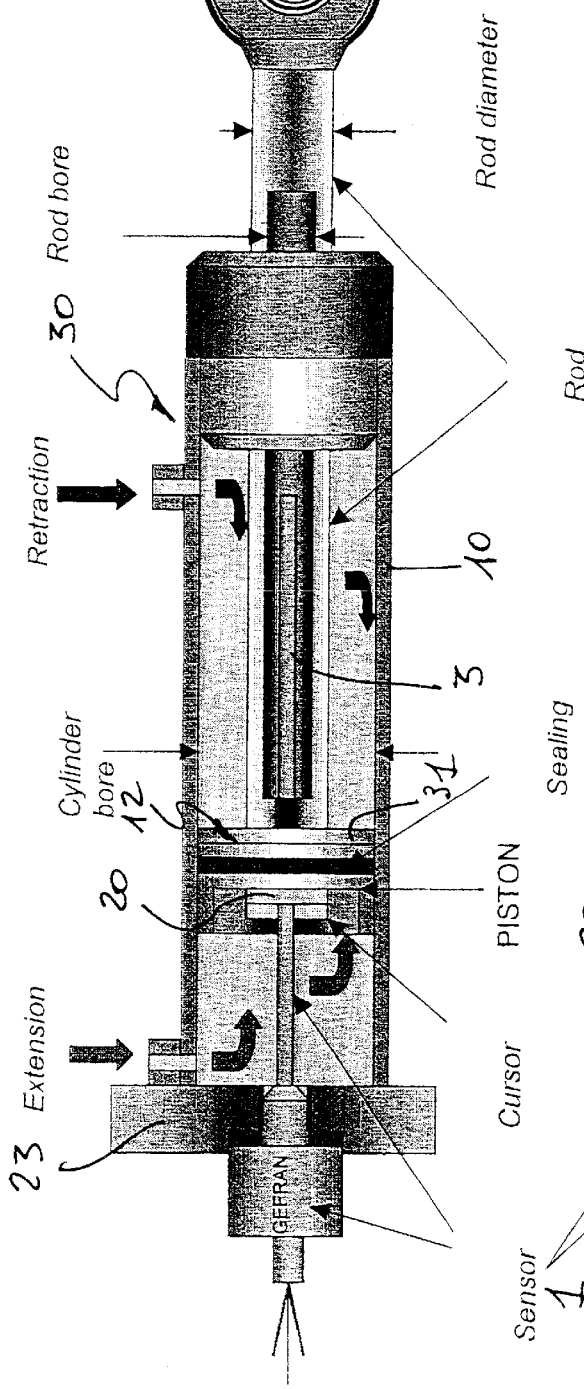
FIG. 4 shows schematically an oil-operated piston/cylinder unit incorporating the sensor of FIG. 1.

The end portion 27 is formed centrally with a sunk annular region 24, whereby the sensor 1 can be held in a corresponding seat 13—formed in the head 23 of the piston/cylinder unit 30—in tight relationship and jutting inside the cylinder, as shown in FIG. 4.

The unit 30 comprises a cylinder 10 and a piston driven by oil pressure inside the cylinder 10.

The sensor 1 extends coaxially with the cylinder 10 inside a cylindrical bore portion 14 in the piston rod 16.

Advantageously, the magnetic actuator 20 is attached to the piston head 31. Thus, any displacement of the piston head 31 through a distance corresponding to the piston stroke length can be sensed directly by the sensor 1.

Of course, the sensor 1 would rest in a pressurized oil bath inside the piston/cylinder unit 30.

The protection rating for the sensor 1 is to ISO Standard IP68. Tests carried out by the Applicant have shown that the sensor 1 can successfully withstand working pressures upward of 300 bar, and a peak pressure of 500 bar.

Figure 5:
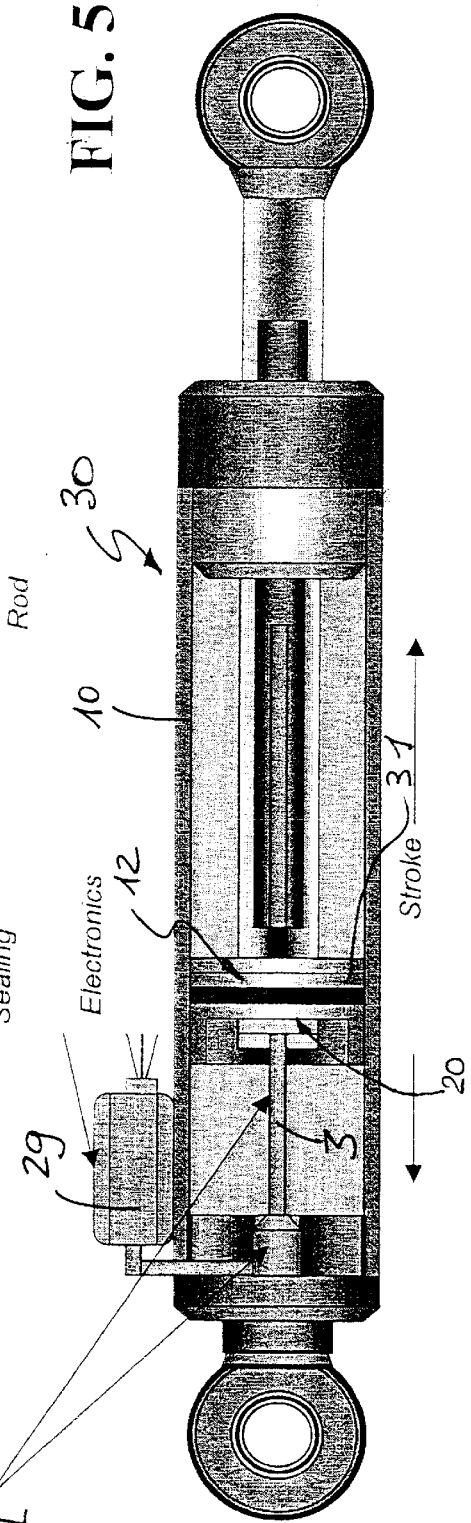
FIG. 5 shows schematically a second embodiment of the piston/cylinder unit of FIG. 2.

In an alternative embodiment, shown schematically in FIG. 5, the electronic device 29 associated with the sensor 1 to form a transducer is mounted on the outer surface of the cylinder 10, close to the cylinder head 23.

The sensor of this invention does solve the technical problem, and offers a number of advantages, chiefly that the sensor is relieved of all constraints connected with the working oil used in the piston/cylinder unit. Thus, any water residue in the oil inside the cylinder would have no effects on the reliability, precision and lifespan of the sensor.

The robust construction of the sensor can face operating temperatures of −30° to +100° C., and storage temperatures exceeding this range by 20° C. (−50° to 120° C.).

Another advantage is that the sensor of this invention can be installed in the cylinder easily and quickly, and allows disassembling and replacement operations to be completed just as easily and quickly.

Another remarkable feature of the inventive sensor is its inherent flexibility, i.e. its applicability in other fields, e.g. as a level sensor for liquid food products.

The sealed steel armor of the sensor rod makes the latter suitable for use with food products, i.e. in all those applications where the rod must be dipped into liquids (wine, oil, water, etc.) intended for drinks and edibles.

The sensor of this invention could also be used in air-operated piston/cylinder units.

What is claimed is:

1. A position sensor for oil-operated piston/cylinder units of the type adapted for installation inside a cylinder of the piston/cylinder unit and comprising a linear potentiometer associated with the piston end;
    a cursor mounted for displacement inside the linear potentiometer;
    a magnetic actuator associated to the piston and in magnetic coupling relationship with said cursor to provide an indication of the piston travel;
    an armored case to house and protect said potentiometer and said cursor;
    said magnetic actuator being slidable along the outer surface of said armored case; and
    wherein the free end of said armored case is closed by a plug welded to said end.

2. A sensor according to claim 1, wherein said magnetic actuator is attached to the piston head.

3. A sensor according to claim 1, wherein said armored case is made of steel.

4. A sensor according to claim 1, wherein said potentiometer is removably inserted into said armored case and held in place by a bias spring means provided between the potentiometer and a ring nut closing one end of the case.

5. A sensor according to claim 1 and having a IP68 protection rating.

6. A sensor according to claim 1, wherein said magnetic actuator has a toroidal structure and includes pairs of permanent magnets that are embedded in the actuator, aligned together in parallel to the case and set at evenly spaced angular positions.

7. A sensor according to claim 1, wherein said cursor carries at least a pair of magnets having pole ends with the same polarity forcibly brought together while said magnetic actuator carries magnet pairs having pole ends with the same polarity brought forcibly together, the polarity of the pole ends of the cursor being opposite of the polarity of the pole ends of the actuator.

8. A sensor according to claim 1, wherein said actuator is coaxial with the armored case.

9. A sensor according to claim 1, wherein said armored case has a bottom end welded to a housing for electric cables connecting to the potentiometer, said housing being received tightly in the cylinder heed.

10. A position sensor installed inside a cylinder of a oil-operated piston/cylinder units, comprising:
    a linear potentiometer being associated with one piston end to provide an indication of the piston travel;
    a cursor mounted for displacement inside said linear potentiometer; said potentiometer and said cursor being housed within an armored case;
    a magnetic actuator associated with the piston and slidable along the outer surface of said case in magnetic coupling relationship with said cursor; and
    wherein the free end of said case is closed by a plug welded to said free end.

11. A sensor according to claim 10, wherein said magnetic actuator is attached to the piston head.

12. A sensor according to claim 10, wherein said armored case is made of steel.

13. A sensor according to claim 10, wherein said case has one free end closed and the opposite end closed by a ring nut; said the potentiometer being removably inserted into said case and held in place by a bias spring means provided between the potentiometer and said ring nut.

14. A sensor according to claim 10, wherein it has IP68 protection rating.

15. A sensor according to claim 10, wherein said magnetic actuator has a toroidal structure and includes pairs of permanent magnets that are embedded in the actuator, aligned together in parallel relationship to the case, and set at evenly spaced angular positions.

16. A sensor according to claim 10, wherein said cursor carries at least a pair of magnets having like pole ends forcibly brought together, said magnetic actuator carrying magnet pairs having like pole ends brought forcibly together.

17. A sensor according to claim 10, wherein said actuator is coaxial with the case.

18. A sensor according to claim 10, wherein said rod has a bottom end welded to a housing for electric cables connecting to the potentiometer, said housing being received tightly in the cylinder head.

19. A oil-operated piston/cylinder unit including a position sensor installed inside a cylinder of the piston/cylinder unit and comprising:
    an armored case;
    a linear potentiometer of a position transducer being housed in said armored case and associated to one end of said unit for providing an indication of the piston travel;
    a cursor mounted for displacement inside said linear potentiometer;
    a magnetic actuator associated with the piston and slidable along the outer surface of said armored case in magnetic coupling relationship with said cursor; and
    wherein the free end of said case is welded by said plug.

20. A sensor according to claim 19, wherein said magnetic actuator is attached to the piston head.

21. A sensor according to claim 19, wherein said armored case is made of steel.

22. A sensor according to claim 19, wherein said case has the end opposite the free end closed by a ring nut; said the potentiometer being removably inserted into said case and held in place by a bias spring means provided between the potentiometer and said ring nut.

23. A sensor according to claim 19 and having a IP68 protection rating.

24. A sensor according to claim 19, wherein said magnetic actuator has a toroidal structure and includes pairs of permanent magnets that are embedded in the actuator, aligned together in parallel relationship to the case, and set at evenly spaced angular positions.

25. A sensor according to claim 19, wherein said cursor carries at least a pair of magnets having pole ends with the same polarity forcibly brought together while said magnetic actuator carries magnet pairs having pole ends with the same polarity brought forcibly together, the polarity of the pole ends of the cursor being opposite of the polarity of the pole ends of the actuator.

26. A sensor according to claim 19, wherein said actuator is coaxial with the case.

27. A sensor according to claim 19, wherein said rod has a bottom end welded to a housing for electric cables connecting to the potentiometer, said housing being received tightly in the cylinder head.

* * * * *